(12) United States Patent
Yoshida

(10) Patent No.: US 6,369,915 B1
(45) Date of Patent: *Apr. 9, 2002

(54) IMAGE PROCESSING APPARATUS FOR ROTATING AN INPUT IMAGE

(75) Inventor: Takehiro Yoshida, Tokyo (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/603,889

(22) Filed: Feb. 22, 1996

(30) Foreign Application Priority Data

Feb. 22, 1995 (JP) ............................... 7-033867

(51) Int. Cl.$^7$ ........................... H04N 1/387; H04N 1/00
(52) U.S. Cl. ....................................... 358/450; 358/440
(58) Field of Search ................................ 358/450, 452, 358/440, 442, 453, 296; 382/295, 296, 297, 298, 301

(56) References Cited

U.S. PATENT DOCUMENTS

| | | | | |
|---|---|---|---|---|
| 4,419,697 A | * | 12/1983 | Wada .......................... | 358/440 |
| 4,689,824 A | * | 8/1987 | Mitchell et al. ............. | 382/297 |
| 4,849,816 A | * | 7/1989 | Yoshida ....................... | 358/434 |
| 5,189,404 A | * | 2/1993 | Masimo et al. ............. | 382/297 |
| 5,239,388 A | * | 8/1993 | Matsumoto .................. | 358/448 |
| 5,301,036 A | * | 4/1994 | Barrett et al. ............... | 382/297 |
| 5,311,607 A | * | 5/1994 | Crosby ........................ | 382/290 |
| 5,389,745 A | * | 2/1995 | Sakamoto .................... | 382/297 |
| 5,452,102 A | * | 9/1995 | Yokoyama et al. ......... | 358/426 |
| 5,461,459 A | * | 10/1995 | Muramatsu et al. ........ | 355/203 |
| 5,486,686 A | * | 1/1996 | Zdybel, Jr. ................... | 235/375 |
| 5,508,810 A | * | 4/1996 | Sato ............................ | 382/297 |
| 5,517,578 A | * | 5/1996 | Altman et al. .............. | 382/181 |
| 5,530,560 A | * | 6/1996 | Nakajima .................... | 358/450 |
| 5,576,848 A | * | 11/1996 | Kusano et al. .............. | 358/450 |
| 5,579,419 A | * | 11/1996 | Yaguchi et al. ............. | 382/297 |
| 5,585,939 A | * | 12/1996 | Yoshida ....................... | 358/438 |
| 5,625,466 A | * | 4/1997 | Nakajima .................... | 382/297 |
| 5,689,342 A | * | 11/1997 | Nakatsuka ................... | 358/296 |
| 5,734,760 A | * | 3/1998 | Yoshida ....................... | 382/296 |
| 6,144,777 A | * | 11/2000 | Tada et al. ................... | 358/450 |

FOREIGN PATENT DOCUMENTS

JP 6-152926 * 5/1994 .......... H04N/1/387

* cited by examiner

Primary Examiner—Kimberly A. Williams
(74) Attorney, Agent, or Firm—Fitzpatrick, Cella, Harper & Scinto

(57) ABSTRACT

A facsimile system includes a transmitting facsimile apparatus including a reading unit for reading an original image, a determination unit for determining the direction of a character in the image read by the reading unit, a rotating unit for rotating the image in accordance with the determination result of the determination unit so that the image read by the reading unit is set in the upward direction, an adding unit for adding a character in the upward direction to a header portion of the image rotated by the rotating unit, and a transmission unit for transmitting the image rotated by the rotating unit to a receiving facsimile apparatus and a receiving facsimile apparatus including a reception unit for receiving the image from the transmitting facsimile apparatus, an adding unit for adding a character in the upward direction to a footer portion of the image received by the reception unit, and a recording unit for recording the image to which the character is added by the adding unit.

6 Claims, 11 Drawing Sheets

FIG. 3A
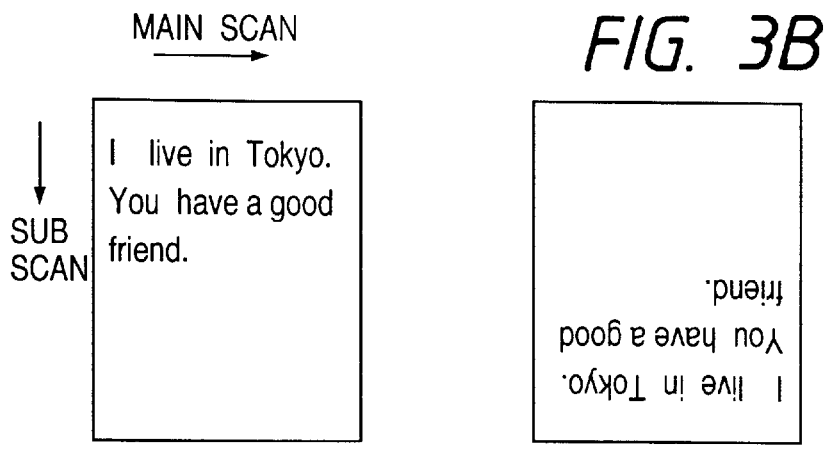
FIG. 3B
FIG. 3C
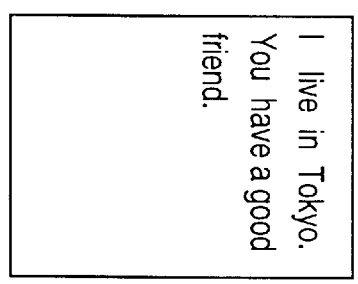
FIG. 3D
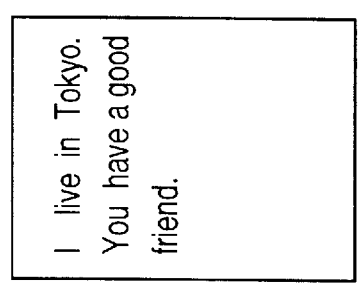
FIG. 3E
HEADER PORTION
| TOKYO | 4/1/94 |
|---|---|
| I live in Tokyo. You have a good friend. | |
FIG. 3F
HEADER PORTION
| TOKYO | 4/1/94 |
|---|---|
| I live in Tokyo. You have a good friend. | |
| 3/1/94 | N.Y. |
FOOTER PORTION

FIG. 4A

I live in Tokyo.
You have a good
friend.

FIG. 4B

I live in Tokyo.
You have a good
friend.

(rotated 180°)

FIG. 4C

I live in Tokyo.
You have a good
friend.

(rotated 90° clockwise)

FIG. 4D

I live in Tokyo.
You have a good
friend.

(rotated 90° counter-clockwise)

FIG. 4E

⎯HEADER PORTION

| TOKYO | 4/1/94 |
|---|---|

I live in Tokyo.
You have a good
friend.

FIG. 4F

⎯HEADER PORTION

| TOKYO | 4/1/94 |
|---|---|

I live in Tokyo.
You have a good
friend.

| 3/1/94 | N.Y. |
|---|---|

FOOTER PORTION

FIG. 5A
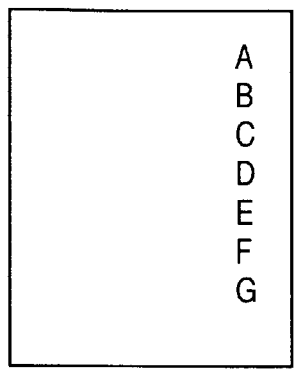
FIG. 5B
FIG. 5C
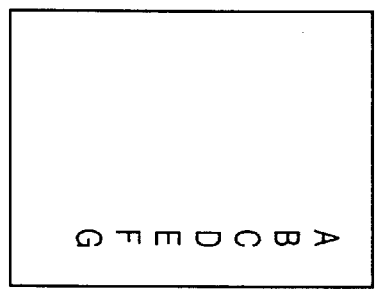
FIG. 5D
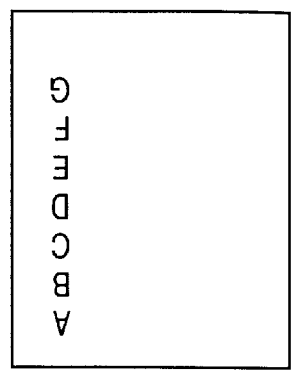
FIG. 5E
HEADER PORTION
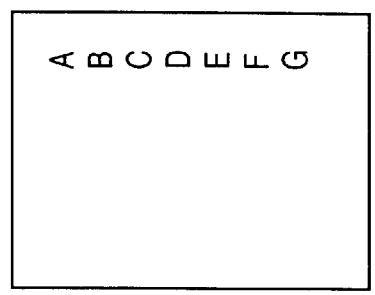
FIG. 5F
HEADER PORTION
FOOTER PORTION

FIG. 6A
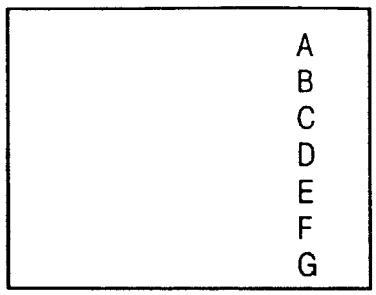
FIG. 6B
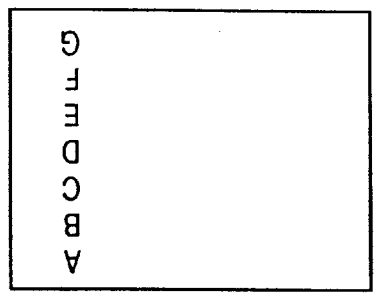
FIG. 6C
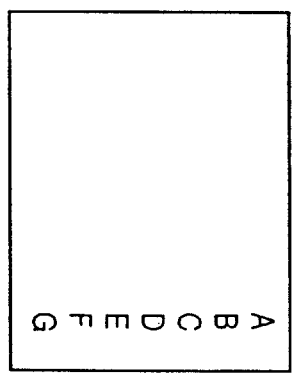
FIG. 6D
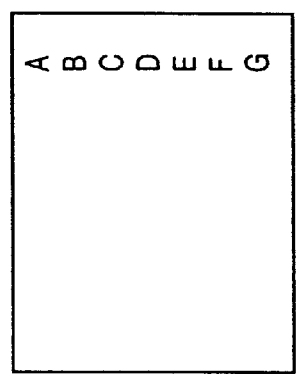
FIG. 6E
HEADER PORTION
| TOKYO | 4/1/94 |
|---|---|
| | A |
| | B |
| | C |
| | D |
| | E |
| | F |
| | G |
FIG. 6F
HEADER PORTION
| TOKYO | 4/1/94 |
|---|---|
| | A |
| | B |
| | C |
| | D |
| | E |
| | F |
| | G |
| 3/1/94 | N.Y. |
FOOTER PORTION

IMAGE PROCESSING APPARATUS FOR ROTATING AN INPUT IMAGE

BACKGROUND OF THE INVENTION

1. Field of the Invention

The present invention relates to an image processing apparatus for rotating an input image in, e.g., a facsimile apparatus.

2. Related Background Art

A conventional transmitting facsimile apparatus transmits an original image while adding characters to a header portion of the original image, and a receiving apparatus records the received image while adding characters to a footer portion of the received image. However, such characters to be added are added at a fixed position independent of the set direction of an original. For this season, if the operator at the transmitting apparatus sets an original in a wrong direction (shifted from a normal direction by ±90° or 180°) and starts a reading operation of the original, the direction of characters in the original does not match that of characters added to the header and footer portions, and the receiving apparatus receives an image which is not easy to read.

SUMMARY OF THE INVENTION

It is an object of the present invention to provide an image processing apparatus, a facsimile apparatus, a facsimile system, and a recording medium which solves the above-mentioned problem.

It is another object of the present invention to provide a facsimile apparatus, a facsimile system, and a recording medium, which matchs the direction of characters in an original image with that of characters to be added.

It is still another object of the present invention to provide an image processing apparatus, which matchs the direction of an input image with that of an image to be synthesized.

Other objects and features of the present invention will become apparent from the following specification and the accompanying drawings.

BRIEF DESCRIPTION OF THE DRAWINGS

FIGS. 3A to 3F are views showing an example of an original;

FIGS. 4A to 4F are views showing an example of an original;

FIGS. 5A to 5F are views showing an example of an original;

FIGS. 6A to 6F are views showing an example of an original;

DESCRIPTION OF THE PREFERRED EMBODIMENTS

The preferred embodiments of the present invention is described in detail hereinafter with reference to the accompanying drawings.

(First Embodiment)

Figure 1:
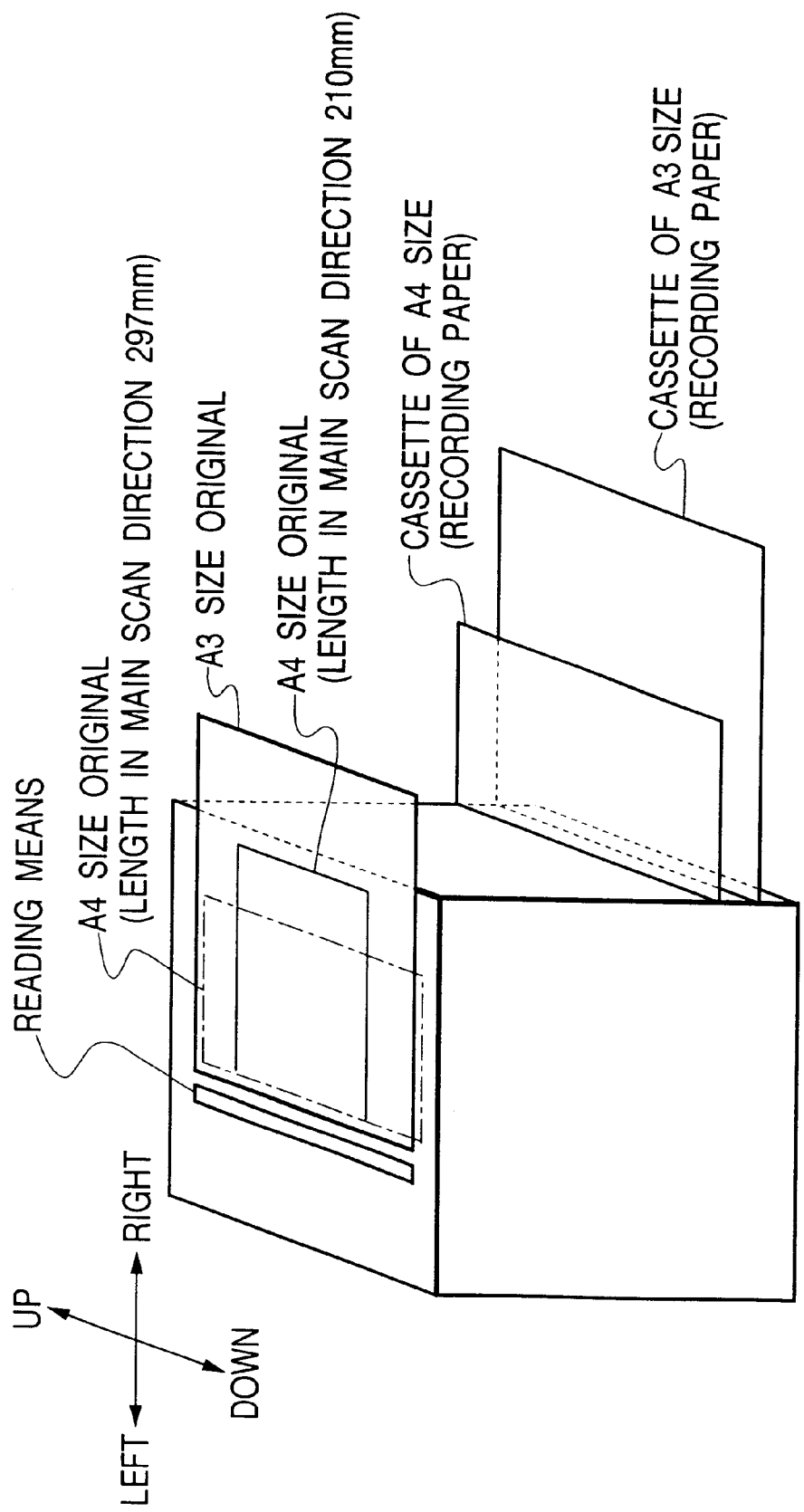
FIG. 1 is a perspective view showing the method of setting an original and a recording paper sheet in a facsimile apparatus according to the first embodiment of the present invention.

FIG. 1 is a perspective view showing the method of setting an original and a recording paper sheet in a facsimile apparatus according to an embodiment of the present invention.

As shown in FIG. 1, in the facsimile apparatus of this embodiment, the reading width of a reading unit is set to have a dimension of 297 mm, in the longitudinal direction, of A4 size, an A4 size original is set to be fed along its widthwise or longitudinal direction, and an A3 size original is set to be fed along its longitudinal direction.

Figure 2:
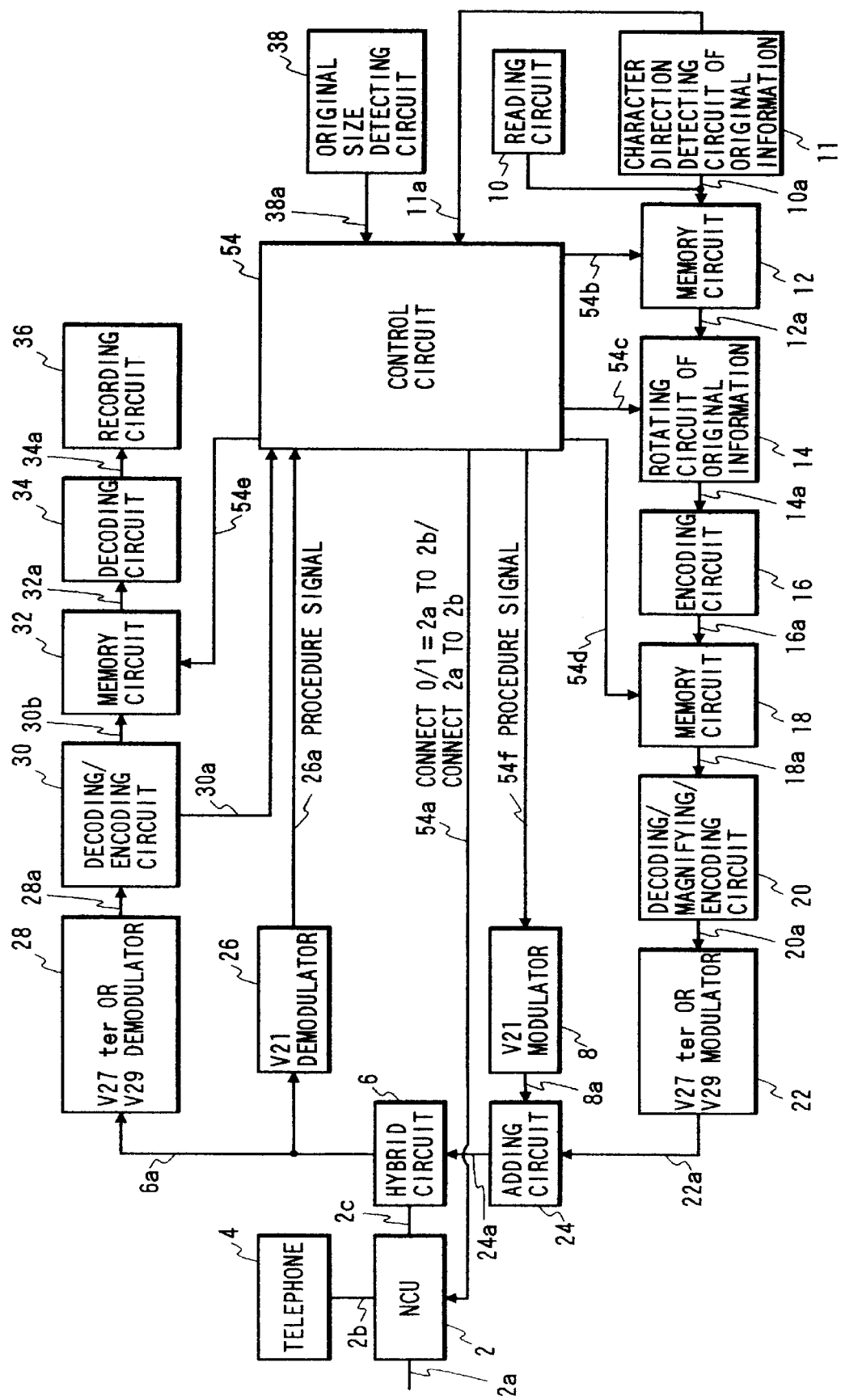
FIG. 2 is a block diagram showing the arrangement of the first embodiment.

FIG. 2 is a block diagram showing the arrangement of a facsimile apparatus of this embodiment. This arrangement is used as both transmitting and receiving apparatuses.

A NCU (network control unit 2) is connected to a terminal of a line to use a telephone network for data communications, and the like, and performs connection control of a telephone exchange network. Also, the NCU 2 performs a switching operation to a data communication path, and maintains the loop until the communication is terminated. When the signal level (signal line 54a) from a control circuit 54 is "0", the NCU 2 connects a telephone line 2a to the telephone 4 side; when the signal level is "1", it connects the telephone line 2a to the facsimile apparatus side. In a normal state, the telephone line 2a is connected to the telephone 4 side.

A hybrid circuit 6 separates a transmission system signal and a reception system signal. The hybrid circuit 6 sends a transmission signal from an adding circuit 24 onto the telephone line 2a via the NCU 2. Also, the hybrid circuit 6 receives a signal from a partner apparatus via the NCU 2, and sends the received signal to a V29 demodulator 28 and a V21 demodulator 26 via a signal line 6a.

A V21 modulator 8 performs modulation based on a known ITU-T recommendation 21. The modulator 8 modulates a procedure signal (signal line 54f) from the control signal 54, and sends the modulated signal to the adding circuit 24 via a signal line 8a.

A reading circuit 10 comprises an image pickup element such as a CCD (charge coupled device) or the like, and an optical system. The circuit 10 sequentially reads an image signal for one line in the main scan direction from an original to be transmitted, generates a signal train representing black and white, binary data, and outputs the signal train from a signal line 10a. The reading circuit 10 has a reading width of 297 mm.

A character direction detecting circuit 11 of original information detects the character direction. FIGS. 3A to 3F show a case wherein characters are written from the left to the right to be parallel to the short side of an original when the characters are set in a normal direction, FIGS. 4A to 4F show a case wherein characters are written from the left to the right to be parallel to the long side of an original when the characters are set in a normal direction, FIGS. 5A to 5F show a case wherein characters are written from up to down to be parallel to the long side of an original when the characters are set in a normal direction, and FIGS. 6A to 6F show a case wherein characters are written from up to down to be parallel to the short side of an original when the characters are set in a normal direction. In FIGS. 3A to 3F, FIGS. 4A to 4F, FIGS. 5A to 5F, and FIGS. 6A to 6F, FIGS. 3A, 4A, 5A, and 6A show the state in the normal direction, FIGS. 3B, 4B, 5B, and 6B show the 180° rotated state, FIGS. 3C, 4C, 5C, and 6C show the 90° rotated state, and FIGS. 3D, 4D, 5D, and 6D show the −90° rotated state.

The character direction detecting circuit 11 of original information detects if the character direction is parallel to the short or long side of an original and if characters are arranged from the left to the right or from up to down, when the characters are set in the normal direction, and discriminates the degree of rotation from the state in the normal direction. More specifically, the circuit 11 outputs, onto a signal line 11a, one of the states shown in FIGS. 3A, 3B, 3C, and 3D, FIGS. 4A, 4B, 4C, and 4D, FIGS. 5A, 5B, 5C, and 5D, and FIGS. 6A, 6B, 6C, and 6D.

A memory circuit 12 stores read data output onto the signal line 10a under the control of a signal on a signal line 54b. Data stored in the memory circuit 12 is output onto a signal line 12a under the control of a signal on the signal line 54b.

A rotating circuit 14 of original information directly outputs read information onto a signal line 14a without rotating it when a signal "0" is output on a signal line 54c; outputs read information onto the signal line 14a while rotating it by 90° when a signal "1" is output on the signal line 54c; outputs read information onto the signal line 14a while rotating it by 180° when a signal "2" is output on the signal line 54c; and outputs read information onto the signal line 14a while rotating it by −90° (=270°) when a signal "3" is output on the signal line 54c. The above-mentioned operation is realized together with the memory circuit 12.

An encoding circuit 16 receives information output on the signal line 14a, and outputs encoded data (MR encoding of K=8) onto a signal line 16a.

A memory circuit 18 stores encoded data output on the signal line 16a under the control of a signal on a signal line 54d, and outputs the stored encoded data onto a signal line 18a.

A decoding/magnifying/encoding circuit 20 receives a signal output on the signal line 18a, and performs magnifying and encoding of the signal after temporarily decoding it, as needed. The circuit 20 outputs the encoded data onto a signal line 20a.

A modulator 22 performs modulation based on a known ITU-T recommendation V27ter (differential phase modulation) or V29 (quadrature amplitude modulation). The modulator 22 receives and modulates a signal on the signal line 22a, and outputs modulated data onto a signal line 22a.

The adding circuit 24 receives signals on the signal lines 8a and 22a, and outputs the sum signal of the received signals onto a signal line 24a.

The demodulator 26 performs demodulation based on a known ITU-T recommendation V21. The demodulator 26 receives a signal on the signal line 6a, performs V21 demodulation, and outputs demodulated data onto a signal line 26a.

The demodulator 28 performs demodulation based on a known ITU-T recommendation V27ter (differential phase modulation) or V29 (quadrature amplitude modulation). The demodulator 28 receives a signal on the signal line 6a, and outputs demodulated data onto a signal line 28a.

A decoding/encoding circuit 30 receives and decodes demodulated data output on the signal line 28a, and outputs the decoded data onto a signal line 30a. Also, the circuit 30 encodes the decoded data by MR encoding of K=8 again, and outputs the encoded data onto a signal line 30b.

A memory circuit 32 stores encoded data output on the signal line 30b under the control of a signal on a signal line 54e, and outputs the data stored therein onto a signal line 32a under the control of a signal on the signal line 54e.

A decoding circuit 34 receives a signal output on the signal line 32a, and outputs decoded data (MR decoding of K=8) onto a signal line 34a.

A recording circuit 36 comprises an LBP (laser beam printer) for receiving data output on the signal line 34a and recording the data by an electrophotographic method.

A detecting circuit 38 detects the size of an original set on an original table. The circuit 38 outputs a signal "0" onto a signal line 38a when an A4 size original is set to have a dimension of 210 mm in the main scan direction; outputs a signal "1" onto the signal line 38a when an A4 size original is set to have a dimension of 297 mm in the main scan direction; and outputs a signal "2" onto the signal line 38a when an A3 size original is set.

The control circuit 54 always transmits transmission information in an easy-to-read form in accordance with the detection result of the detecting circuit 11 for detecting the character direction of original information in a facsimile apparatus which can rotate read information by ±90° and 180°. More specifically, the control circuit 54 rotates read information by ±90° and 180°, so that characters of original information are arranged from the left to the right or from up to down in the state in the normal direction, and transmits the rotated information. The control circuit 54 mainly performs the above-mentioned control.

FIGS. 7 to 10 are flow charts showing the control operation of the control circuit 54 shown in FIG. 2.

Figure 7:
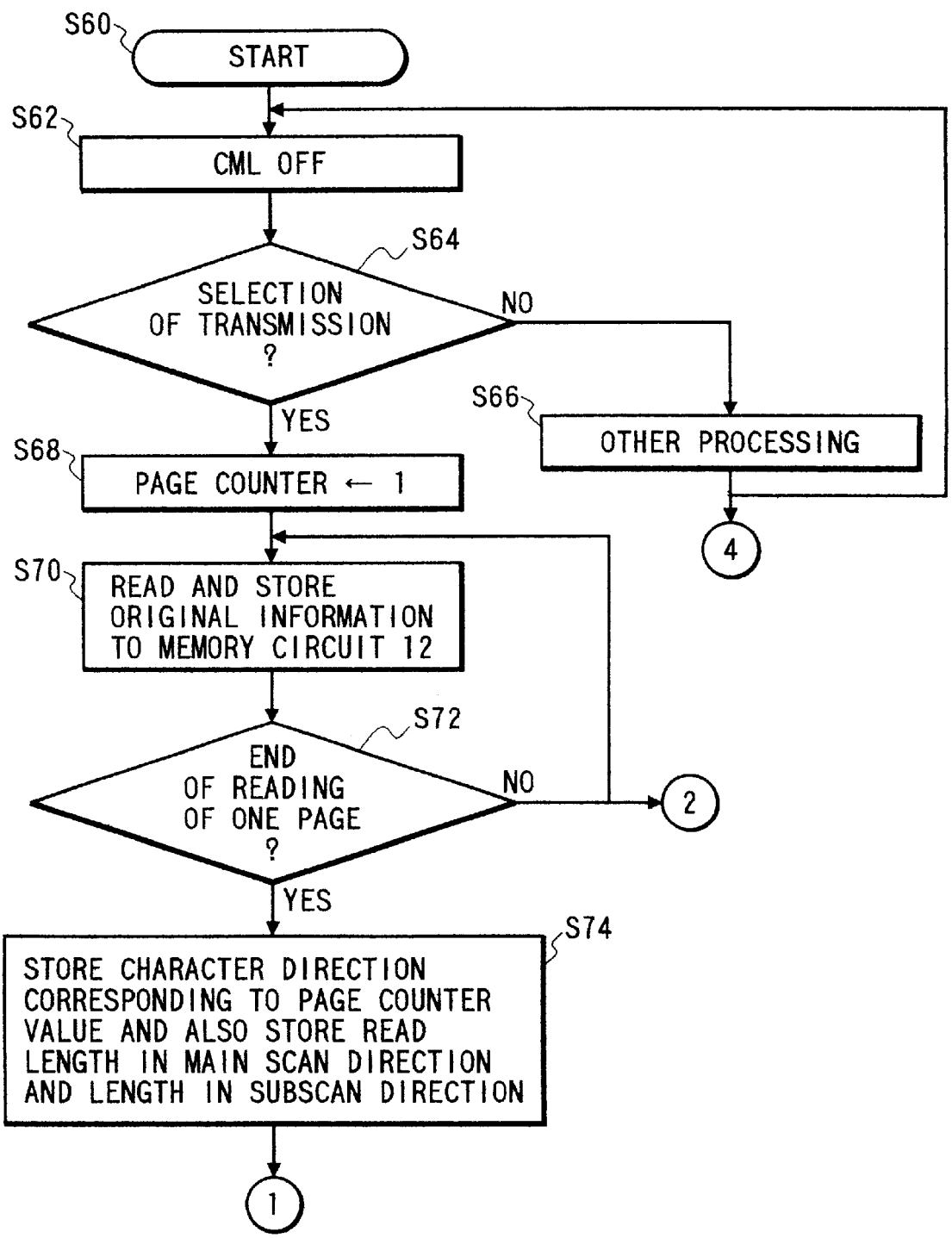
FIG. 7 is a flow chart showing the operation of the first embodiment.

In FIG. 7, step S60 represents the start step. In step S62, a signal of signal level "0" is output onto the signal line 54a to turn off a CML. In step S64, it is checked if the transmission mode is selected. If YES in step S64, the flow advances to step S68; otherwise, other processing is performed in step S66.

In step S68, "1" is set in a page counter. In step S70, original information is read, and is stored as raw data in the memory circuit 12.

In step S72, it is checked if the reading operation of one page has ended. If YES in step S72, the flow advances to step S74; otherwise, the flow returns to step S70.

In step S74, information on the signal line 11a, i.e., the character direction of the original information, is stored in correspondence with the page counter value, and the dimensions in the main scan and subscan directions of the currently read original information are also stored.

In step S76 in FIG. 8, a signal is set in the signal line 54c as follows in accordance with the information on the signal line 11a. That is, if the currently read information is on the type shown in FIG. 3B, 4B, 5B, or 6B, a signal indicating that the information is rotated by 180° is set; if the read information is of the type shown in FIG. 3C, 4C, 5C, or 6C, a signal indicating that the information is rotated by −90° is set; if the read information is of the type shown in FIG. 3D, 4D, 5D, or 6D, a signal indicating that the information is rotated by 90° is set; or if the read information is of the type shown in FIG. 3A, 4A, 5A, or 6A, a signal indicating that the information is not rotated is set. With this operating, the original information is set in the direction shown in FIG. 3A, 4A, 5A, or 6A. In addition, the dimensions in the main scan and subscan directions of the rotated read image information are stored in correspondence with the page counter value.

In step S78, the read information is rotated as needed in accordance with the signal set in step S76, and is encoded. The encoded information is stored in the memory circuit 18.

In step S80, it is checked if the next page is present. If YES in step S80, the page counter value is incremented by 1 in step S82; otherwise, the flow advances to step S84 in FIG. 9.

Figure 9:
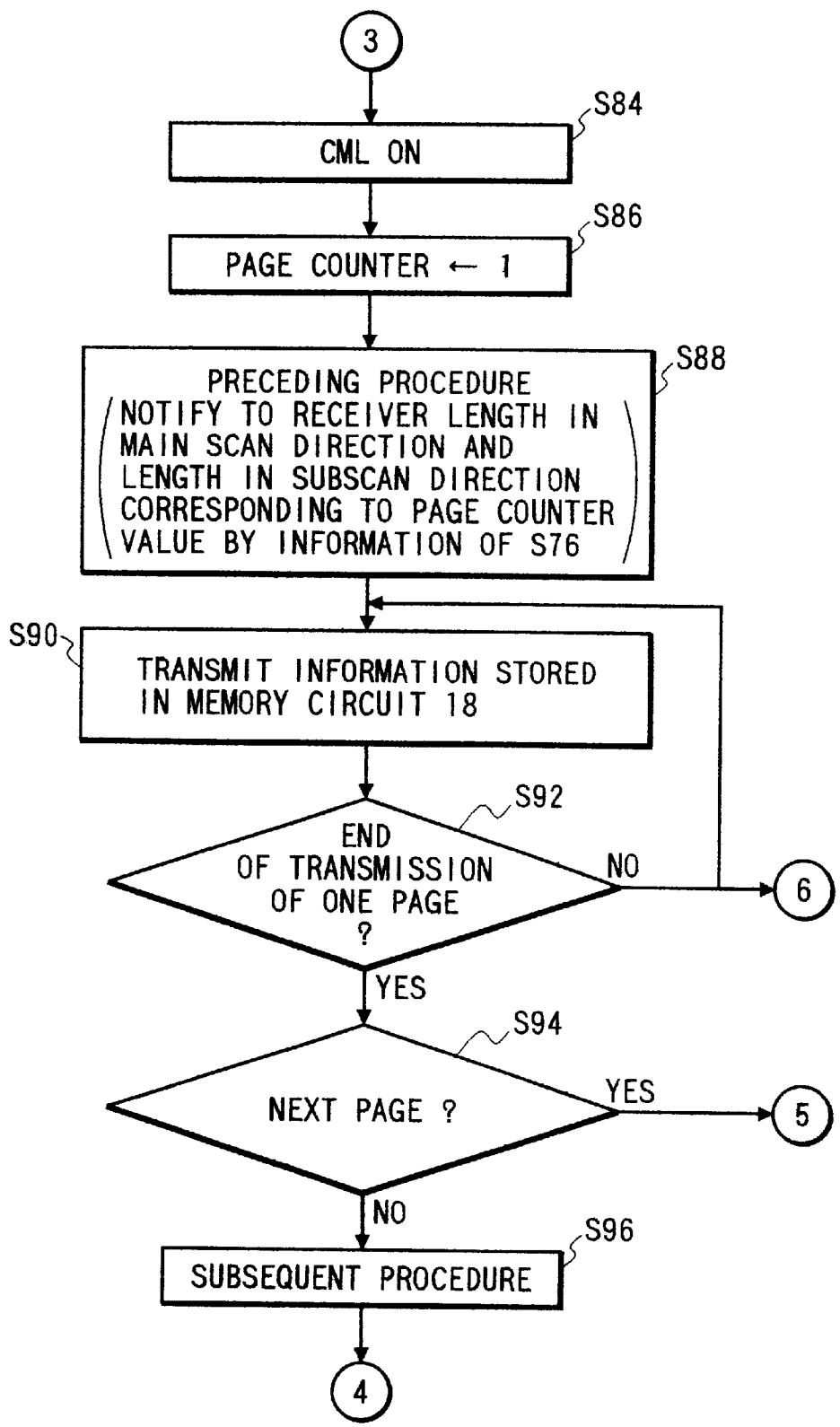
FIG. 9 is a flow chart showing the operation of the first embodiment.

In step S84 in FIG. 9, a signal of signal level "1" is output onto the signal line 54a to turn on the CML. In step S86, "1" is set in the page counter.

In step S88, a preceding procedure is performed. In this procedure, the dimensions in the main scan and subscan directions corresponding to the page counter value are notified to a receiver in accordance with the information set in step S76.

In step S90, the image information stored in the memory circuit 18 is decoded, and character information indicating a transmission source, date, and the like is added to a header portion (see FIG. 3E, 4E, 5E, or 6E) of each page of the decoded information. Thereafter, the information is encoded and transmitted. In step S92, it is checked if transmission of one page has ended. If YES in step S92, the flow advances to step S94; otherwise, the flow returns to step S90. Upon transmission, the information is sent in the order from the uppermost line parallel to the main scan direction in FIG. 3A, 4A, 5A, or 6A in units of lines.

In step S94, it is checked if the next page is present. If YES in step S94, the flow jumps to step S98; otherwise, the flow advances to step S96 to perform a subsequent procedure.

Figure 10:
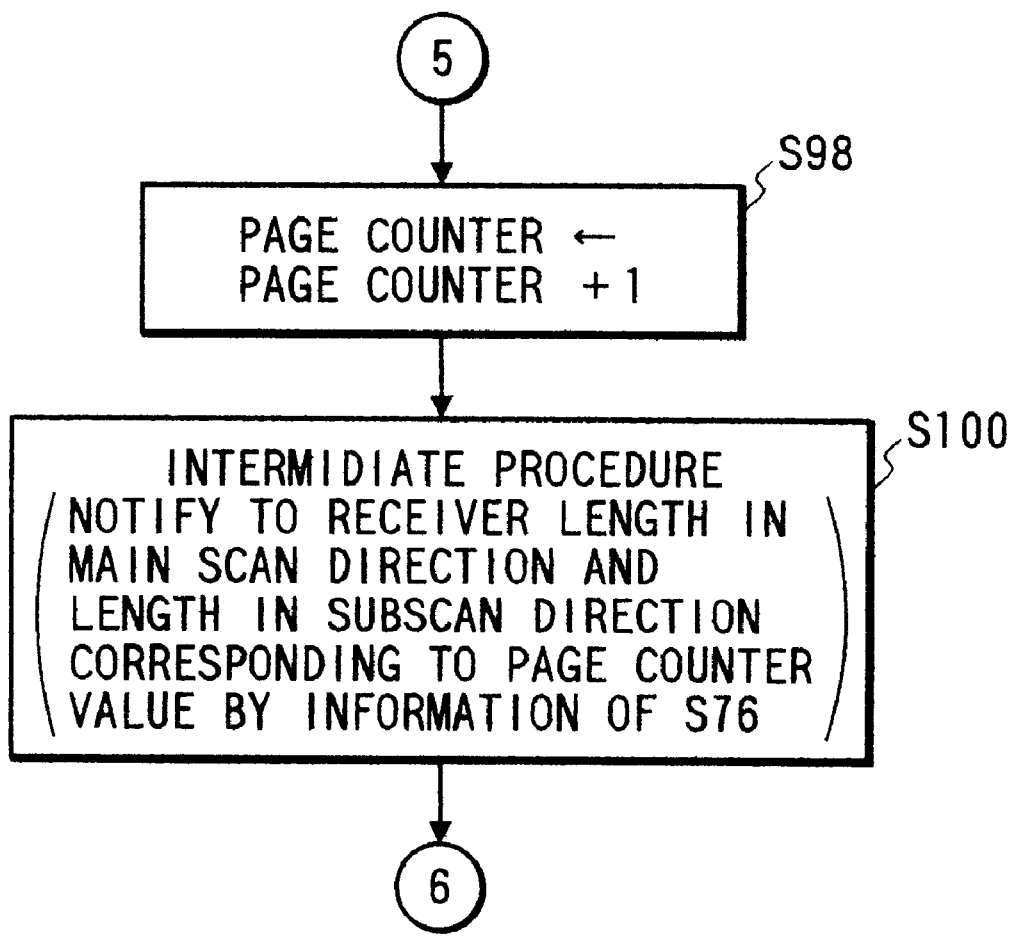
FIG. 10 is a flow chart showing the operation of the first embodiment.

In step S98 in FIG. 10, the page counter value is incremented by 1. In step S100, an intermediate procedure is performed. In this procedure, the dimensions in the main scan and subscan directions corresponding to the page counter value are notified to a receiver in accordance with the information set in set S76. The receiver records the received information on a paper sheet while adding character information indicating a date or the like to a footer portion (see FIG. 3F, 4F, 5F, or 6F) of each page.

As described above, an original image is rotated to be set in the normal direction shown in FIG. 3A, 4A, 5A, or 6A in correspondence with the character direction, and thereafter, header information is added to the image information. Then, the image information is transmitted. For this reason, independent of the setting direction of an original on the recording unit, characters on the original, header characters, and footer characters are recorded in the same direction, thus obtaining an image which is very easy for a user to read. As described above, rotation processing is performed independent of the direction of an original region (frame) so as to match the character direction of an original with a predetermined direction as the direction of header characters.

(Second Embodiment)

In the second embodiment, a facsimile apparatus which can rotate read information by ±90° and 180° comprises means for detecting the character direction of original information, and transmits the information at a high information compression rate. More specifically, read information is rotated by ±90° or 180° as needed so that characters or original information are to be arranged from the left to the right in a state in the normal direction. Also, in a case where characters are to be arranged from up to down in the state in the normal direction, read information is rotated by ±90° or 180° as needed to obtain information rotated by 90° from the state in the normal direction. Then, the rotated information is transmitted.

Figure 11:
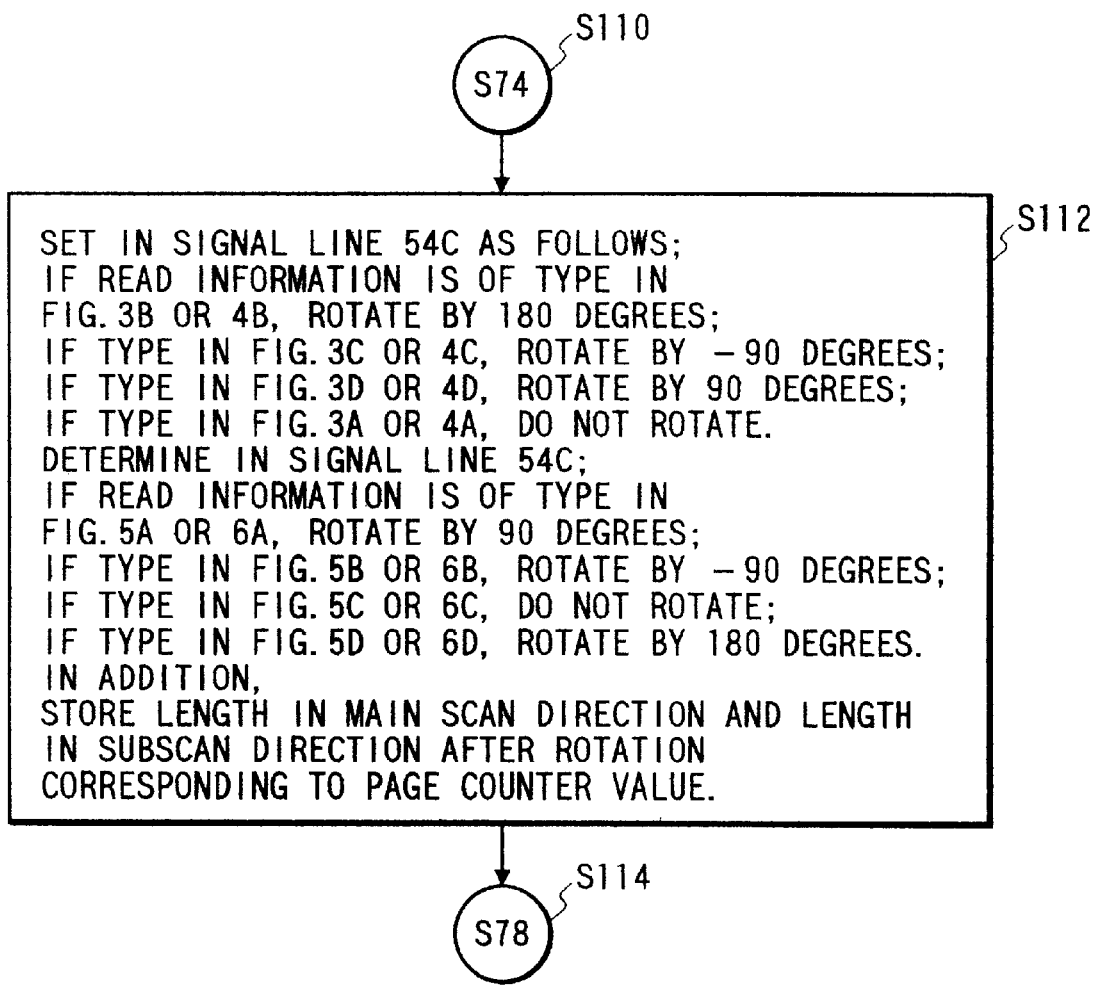
FIG. 11 is a flow chart showing the operation according to the second embodiment of the present invention.

FIG. 11 is a flow chart showing an example of the above-mentioned control operation except for the same portions as those shown in FIGS. 7, 8, 9, and 10.

In FIG. 11, step S110 represents step S74 in FIG. 7. In step S112, a signal is set in the signal line 54c as follows in accordance with the information on the signal line 11a. That is, if the currently read information is of the type shown in FIG. 3B or 4B, a signal indicating that the information is rotated by 180° is set; if the read information is of the type shown in FIG. 3C or 4C, a signal indicating that the information is rotated by −90° is set; if the read information is of the type shown in FIG. 3D or 4D, a signal indicating that the information is rotated by 90° is set; or if the read information is of the type shown in FIG. 3A or 4A, a signal indicating that the information is not rotated is set. On the other hand, if the read information is of the type shown in FIG. 5A or 6A, a signal indicating that the information is rotated by 90° is set; if the read information is of the type shown in FIG. 5B or 6B, a signal indicating that the information is rotated by −90° is set; if the read information is of the type shown in FIG. 5C or 6C, a signal indicating that the information is not rotated is set; or if the read information is of the type shown in FIG. 5D or 6D, a signal indicating that the information is rotated by 180° is set. In addition, the dimensions in the main scan and subscan directions of the rotated read image information are stored in correspondence with the page counter value.

Figure 8:
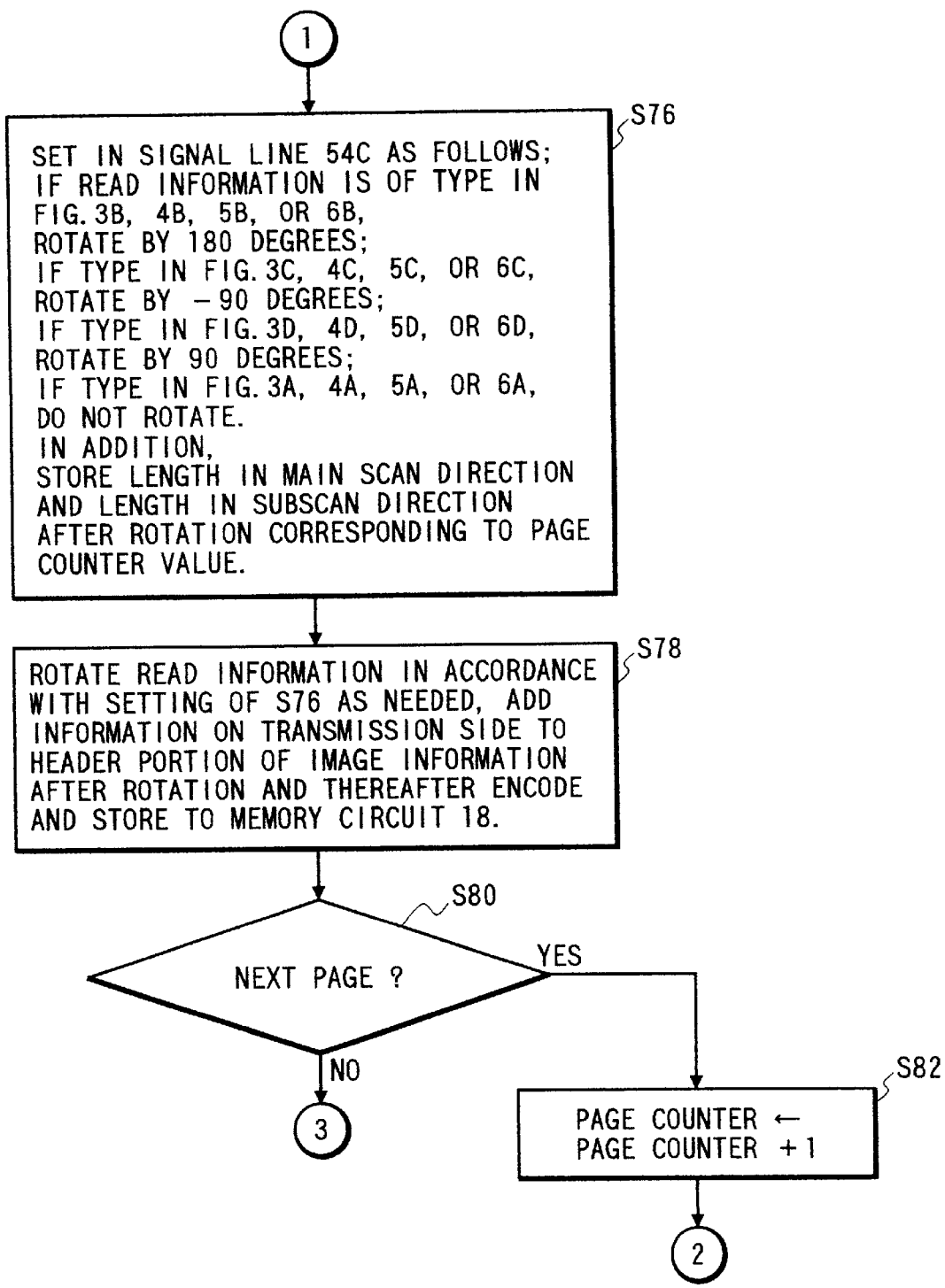
FIG. 8 is a flow chart showing the operation of the first embodiment.

Step S114 represents step S78 in FIG. 8. In steps S78, S88, and S100, information set in step S112 is used in place of that set in step S76.

(Third Embodiment)

The first embodiment may be applied to information received by a receiver, and the received information may be output in an easy-to-read form.

(Other Embodiment)

In the first to third embodiments, the present invention is applied to a facsimile apparatus. However, the above-mentioned rotation processing and image addition processing may be realized in a copying machine or by a program that can be executed by a personal computer. Note that the program of the personal computer is stored in a floppy disk, a CD-ROM, a hard disk, or the like. In order to realize the present invention by the personal computer, a scanner, a printer, a modem, and the like are connected to the personal computer.

What is claimed is:

1. A facsimile apparatus comprising:

reading means for reading an original image to form a read image;

determination means for determining a direction of a read character in the read image;

rotating means for rotating the read image in accordance with a determination result of said determination means so that a direction of the read image is same as a direction of another character to be subsequently added on one surface of an output medium;

adding means for adding the another character to a predetermined position of the read image rotated by said rotating means, wherein the added another character represents transmission source information; and transmission means for transmitting to a predetermined destination via a communication line the read image to which the another character is added by said adding means.

2. An apparatus according to claim 1, wherein said adding means adds the character to a header portion of each page.

3. An apparatus according to claim 1, wherein said adding means adds characters representing a transmission source and a date.

4. A facsimile method comprising the steps of:

reading an original image to form a read image;

determining a direction of a read character in the read image;

rotating the read image in accordance with a determination result in the determining step so that a direction of the read image is same as a direction of another character to be subsequently added on one surface of an output medium;

adding the another character to a predetermined position of the read image rotated in the rotating step, wherein the added another character represents transmissions source information; and transmitting to a predetermined destination via a communication line the read image to which the another character is added in the adding step.

5. A method according to claim 4, wherein the adding step includes the step of adding the character to a header portion of each page.

6. A method according to claim 4, wherein the adding step includes the step of adding characters representing a transmission source and a date.

* * * * *

UNITED STATES PATENT AND TRADEMARK OFFICE
CERTIFICATE OF CORRECTION

PATENT NO. : 6,369,915 B1
DATED : April 9, 2002
INVENTOR(S) : Takehiro Yoshida

It is certified that error appears in the above-identified patent and that said Letters Patent is hereby corrected as shown below:

Column 1,
Line 33, "matchs" should read -- matches --; and
Line 36, "matchs" should read -- matches --.

Column 2,
Line 6, "is" should read -- are --.

Column 4,
Line 29, "and" should read -- or --.

Column 5,
Line 39, "in set" should read -- in step --; and
Line 64, "or" should read -- of --.

Column 6,
Line 56, "same" should read -- the same --.

Column 7,
Line 12, "same" should read -- the same --.

Column 8,
Line 3, "transmissions" should read -- transmission --.

Signed and Sealed this

Eleventh Day of June, 2002

Attest:

Attesting Officer

JAMES E. ROGAN
Director of the United States Patent and Trademark Office